United States Patent
Kitajima et al.

(10) Patent No.: US 8,641,047 B2
(45) Date of Patent: Feb. 4, 2014

(54) FLUORORUBBER-METAL LAMINATE GASKET MATERIAL

(75) Inventors: Yasuaki Kitajima, Kanagawa (JP); Kiyofumi Fukasawa, Kanagawa (JP)

(73) Assignee: NOK Corporation, Tokyo (JP)

( * ) Notice: Subject to any disclaimer, the term of this patent is extended or adjusted under 35 U.S.C. 154(b) by 504 days.

(21) Appl. No.: 12/933,731

(22) PCT Filed: Dec. 10, 2008

(86) PCT No.: PCT/JP2008/072369
§ 371 (c)(1), (2), (4) Date: Sep. 21, 2010

(87) PCT Pub. No.: WO2009/122618
PCT Pub. Date: Oct. 8, 2009

(65) Prior Publication Data
US 2011/0012315 A1   Jan. 20, 2011

(30) Foreign Application Priority Data
Apr. 4, 2008  (JP) .................................. 2008-097713

(51) Int. Cl.
*F02F 11/00* (2006.01)
*F16J 15/12* (2006.01)

(52) U.S. Cl.
USPC ........................................ 277/592; 277/935

(58) Field of Classification Search
USPC ................... 277/590–601, 935–946
See application file for complete search history.

(56) References Cited

U.S. PATENT DOCUMENTS

2007/0142510 A1*  6/2007  Ono et al. ..................... 524/104

FOREIGN PATENT DOCUMENTS

| JP | 07-165953 | 6/1995 |
|----|-----------|--------|
| JP | 2004-076699 | 3/2004 |
| JP | 2004-083623 | 3/2004 |
| JP | 2004-202725 | 7/2004 |
| JP | 2006-218629 | 8/2006 |
| JP | 2006-218630 | 8/2006 |

OTHER PUBLICATIONS

Machine translation of Fukazawa JP2006-218629.*
International Search Report from corresponding PCT application No. PCT/JP2008/072369 dated Mar. 17, 2009, 2 pages.
International Preliminary Report on Patentability and Written Opinion from corresponding PCT application No. PCT/JP2008/072369 filed Nov. 20, 2010, 6 pgs.

* cited by examiner

*Primary Examiner* — Gilbert Lee
(74) *Attorney, Agent, or Firm* — Brinks Gilson & Lione

(57) ABSTRACT

A fluororubber-metal laminate gasket material, which comprises a metallic steel sheet, a zirconium element-, phosphorus element-, and aluminum element-containing surface-treating agent layer, a silica-containing thermosetting phenol resin-based vulcanizing adhesive layer, and a fluororubber layer, as successively laid upon one another on the metallic steel sheet, where the silica-containing thermosetting phenol-based vulcanizing adhesive is a thermosetting phenol resin-based vulcanizing adhesive comprising silica and cresol novolak-type epoxy resin or phenol novolak-type epoxy resin, and further containing 11-80 parts by weight of an aliphatic amine-based compound or a mixture thereof with an imidazole-based compound as a curing accelerator on the basis of 100 parts by weight of the thermosetting phenol resin, where the aliphatic amine-based compound and the imidazol-based compound are in a proportion of the former to the latter of 100-10 wt. % to 0-90 wt. %.

12 Claims, No Drawings

FLUORORUBBER-METAL LAMINATE GASKET MATERIAL

RELATED APPLICATION

This application is a 35 U.S.C. §371 national phase filing of International Patent Application No. PCT/JP2008/072369, filed Dec. 10, 2008, through which and to which priority is claimed under 35 U.S.C. §119 to Japanese Patent Application No. 2008-097713, filed Apr. 4, 2008.

TECHNICAL FIELD

The present invention relates to a fluororubber-metal laminate gasket material, and more particularly to a fluororubber-metal laminate gasket material suitable to use for engine cylinder head gaskets, etc.

BACKGROUND ART

Stainless steel has been so far used for engine cylinder head gaskets requiring an LLC (long life coolant) resistance, but any good liquid-resistant adhesion durability cannot be obtained even by direct application of a vulcanizing adhesive to the stainless steel, followed by vulcanization bonding of rubber thereon, resulting in peeling the bonded rubber, when subjected to immersion tests.

The present applicant has so far proposed a fluororubber-metal laminate gasket material, which comprises a metallic steel sheet, a zirconium element-, phosphorus element-, and aluminum element-containing surface-treating agent layer, a silica-containing thermosetting phenol resin-based vulcanizing adhesive layer, and a fluororubber layer, as successively laid upon one another on the metallic steel layer, as a fluororubber-metal laminate gasket material free from peeling of the bonded layer even if used in an electrolyte at the same time with a different metal species in the actual gasket use circumstances, thereby proving to hold the adhesiveness for a sufficiently long time.

Patent Literature 1 JP-A-2006-218629

DISCLOSURE OF THE INVENTION

Problem to be Solved by the Invention

The object of the present invention is to provide a fluororubber-metal laminate gasket material, which comprises a metallic steel sheet, a zirconium element-, phosphorus element-, and aluminum element-containing surface-treating agent layer, a silica-containing thermosetting phenol resin-based vulcanizing adhesive layer, and a fluororubber layer, as successively laid upon one another on the metallic steel sheet, whereby the LLC resistance can be much more improved.

Means for Solving the Problem

In the afore-mentioned fluororubber-metal laminate gasket material, the object of the present invention can be attained by using a silica and cresol novolak-type epoxy resin or phenol novolak-type epoxy resin-containing thermosetting phenol resin-based vulcanizing adhesive as the silica-containing thermosetting phenol resin-based vulcanizing adhesive, where the thermosetting phenol resin-based vulcanizing adhesive further contains 11-80 parts by weight of an aliphatic amine-based compound or a mixture thereof with an imidazole-based compound as a curing accelerator on the basis of 100 parts by weight of the thermosetting phenol resin, the aliphatic amine-based compound and the imidazole-based compound being in a proportion of the former to the latter of 100-10 wt. % to 0-90 wt. %.

Effects of the Invention

In the afore-mentioned fluororubber-metal laminate gasket material, the LLC resistance as determined and evaluated under immersing conditions of 150° C. for 100 hours or 500 hours, and the heat resistance as determined and evaluated under heating conditions of 220° C. for 100 hours or 240 hours can be much more improved, and particularly in the case of mandrel test using a smaller diameter, which can cause peeling much easily, a good LLC resistance can be obtained, by using a thermosetting phenol resin-based vulcanizing adhesive containing silica and cresol novolak-type epoxy resin or phenol novolak-type epoxy resin as the silica-containing thermosetting phenol resin-based vulcanizing adhesive, and by making the thermosetting phenol resin-based vulcanizing adhesive further contain 11-80 parts by weight of an aliphatic amine-based compound or a mixture thereof with an imidazole-based compound on the basis of 100 parts by weight of the thermosetting phenol resin, thereby prolonging lives of gaskets, particularly engine cylinder head gaskets.

BEST MODES FOR CARRYING OUT THE INVENTION

The metallic steel sheets for use in the present invention include sheets of iron, aluminum, copper, etc., or alloys thereof, and stainless steel, etc., generally stainless steel sheets of SUS301, SUS301H, SUS304, SUS430, etc. A film layer of a surface treating agent containing zirconium, phosphorus, and aluminum can be formed on the steel sheet.

In the film layer of the surface-treating agent, zirconium and aluminum are in a ratio by elementary mass of the former to the latter of 90:10 to 10:90, preferably 70:30 to 30:70, and zirconium and phosphorus are in a ratio by elementary mass of the former to the latter of 95:5 to 60:40, preferably 90:10 to 68:32. When the aluminum is in a ratio of more than 90, film-forming failure will occur, or the formed film will be easily detached, whereas when it is in a ratio of less than 10, the heat resistance and the water resistance of the film will be lowered. When the phosphorus is in a ratio of more than 40, the heat resistance of the film will be lowered, whereas when it is in a ratio of less than 5, the film-forming failure will occur.

In the film layer, the zirconium component exists in the form of zirconium phosphate or zirconium oxide, and the zirconium existence in the form of zirconium phosphate is preferable. The surface-treating agent solution containing zirconium nitrate, zirconium acetate, zirconium sulfate, zirconium ammonium carbonate, zirconium oxide, or the like can be used to form the zirconium component in the film layer. Preferably, the surface-treating agent solution containing zirconium ammonium carbonate can be used. Aluminum can be made to exist in the film layer by a surface-treating agent solution containing aluminum silicate, alumina (aluminum oxide), aluminum hydroxide, aluminum sulfate, or the like. It is preferable that aluminum exists in the form of aluminum oxide in the film layer. The phosphorus component can be provided into the film layer by adding phosphoric acid thereto, where the amount of phosphoric acid to be added is adjusted to a ratio by mass of Zr:P=95.5 to 60:40.

To enhance the effect of the surface-treating agent or ensure the solution stability, the surface-treating agent can further contain an inorganic acid such as nitric acid, sulfuric acid, etc., an organic acid such as formic acid, acetic acid, etc., a nitrogen-containing alkaline compound, such as ammonium hydroxide (aqua ammonia), ethylenediamine, triethylenetetramine, morpholine, choline, etc. or the like.

The surface-treating agent can be applied as a solution or dispersion of the afore-mentioned components in water to an alkali-defatted or likewise defatted steel sheet, preferably stainless steel sheet, to a coating weight on each side of about 10 to about 1,000 mg/m$^2$, preferably about 50 to about 500 mg/m$^2$ by a spraying, immersing, brush coating, roll coating, etc., followed by drying at room temperature, or with hot air, and baking at about 100° to about 250° C. for about 0.5 to about 20 minutes.

A film layer of thermosetting phenol resin-based vulcanizing adhesive containing silica and cresol novolak-type epoxy resin or phenol novolak-type epoxy resin is formed on the surface-treating agent-treated steel sheet, preferably stainless steel sheet.

The silica (silicon oxide) for use in the present invention includes dry process or wet process silica having a SiO$_2$ content of 85 wt. % or more, as dispersed in an organic solvent or water, preferably fine particles of anhydrous silica of high purity as dispersed in an organic solvent or water, that is, silica in a colloidal state, so-called colloidal silica. The colloidal silica for use in the present invention has an average particle size of 1-50 nm, preferably 10-30 nm, and dispersed in an organic solvent such as methanol, methyl ethyl ketone, methyl isobutyl ketone, etc. Commercially available products can be used, for example, methanol silica sol (a product of Nissan Chemical Industries, Ltd.; dispersion having a solid matter concentration of 30 wt. % in methanol), Snowtex MEK-ST (a product of the same company as above; dispersion having a solid matter concentration of 30 wt. % in methyl ethyl ketone), Snowtex MIBK-ST (a product of the same company as above; dispersion having a solid matter concentration of 30 wt. % in methyl isobutyl ketone) etc.

The silica can be used in a dispersion state in the thermosetting phenol resin or further together with unvulcanized fluororubber (compound).

The thermosetting phenol resin for use as one component of the vulcanizing adhesive includes not only a resol-type phenol resin, but also a phenol resin having a dihydrobenzooxazine ring, and further together with other thermosetting resin such as a cresol novolak-type epoxy resin or a phenol novolak-type epoxy resin, or still further together with unvulcanized fluororubber or fluororubber compound.

The resol-type phenol resin for use in the present invention includes resins having a softening point of about 80°-150° C., obtained by condensation reaction of phenol having 2 or 3 replaceable nuclear hydrogen atoms at o-position and/or p-position with respect to the phenolic hydroxyl group such as phenol, p-cresol, m-cresol, p-t-butylphenol, p-phenylphenol, bisphenol A, etc. or a mixture thereof with formaldehyde in the presence of an alkali catalyst such as sodium hydroxide, sodium carbonate, magnesium hydroxide, ammonia, etc. and preferably resol-type phenol resins having a softening point of 100° C. or higher, prepared from a mixture of m-cresol and p-cresol, and formaldehyde are used.

The novolak-type phenol resin for use in the present invention includes those obtained by conducting the afore-mentioned condensation reaction in the presence of an acidic catalyst such as hydrochloric acid, oxalic acid, etc.

The thermosetting phenol resin having a dihydrobenzooxazine ring for use in the present invention include any thermosetting phenol resins having a dihydrobenzooxazine ring and capable of curing by ring-opening reaction of dihydrobenzooxazine ring. Dihydro-2H-1,3-benzooxazine derivative as a compound having a dihydrobenzooxazine ring can be synthesized from, e.g. a compound having a phenolic hydroxyl group, a primary amine, and folmaldehyde, as shown in the following reaction scheme

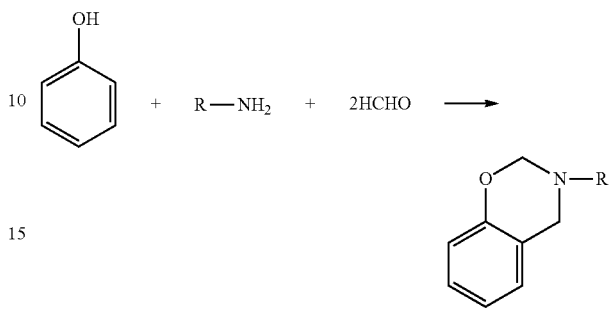

Patent Literature 2 JP-A-2004-83623

The compound having a phenolic hydroxyl group must have a hydrogen atom bonded to at least one o-position with respect to the phenolic hydroxyl group of aromatic ring, and preferably polyfunctional phenols having a plurality of phenolic hydroxyl groups in the molecule can be used. For example, phenols such as catechol, resorcinol, hydroquinone, etc., dihydroxynaphthalenes such as 1,5-dihydroxynaphthalene, 2,6-dihydroxynaphthalene, etc., bisphenols such as bisphenol A, bisphenol F, etc., phenol resins such as novolaktype or resol-type phenol resin, melaminephenol resin, alkylphenol resin, etc.

The primary amine includes, for example, aromatic amines such as aniline, toluidine, etc. and aliphatic amines such as methylamine, ethylamine, etc.

One mole each of the compound having a phenolic hydroxyl group and the primary amine, and at least 2 moles of formaldehyde are subjected to reaction in the presence of an oxalic acid catalyst or the like at a reaction temperature of about 70° to about 130° C., preferably about 90° to about 110° C. for about ⅓ to about 4 hours, followed by removal of unreacted phenolic compound, primary amine, formaldehyde, etc. at not higher than 120° C. under subatmospheric conditions, thereby obtaining a thermosetting resin having a dihydrobenzooxazine ring.

Silica and phenol resin component can be used in a proportion of about 5 to about 200 parts by weight, preferably about 10 to about 100 parts by weight of silica to 100 parts by weight of phenol resin component. When the silica proportion is more than about 200 parts by weight, the initial adhesiveness will be lowered, whereas when in a proportion of less than about 5 parts by weight the water resistance of the adhesive layer will be lowered.

Cresol novolak-type epoxy resin or phenol novolak-type epoxy resin can be used in a proportion of not more than about 500 parts by weight, preferably about 20 to about 200 parts by weight, to 100 parts by weight of the phenol resin. The initial adhesiveness can be increased by simultaneous use of the epoxy resin, but when used in a proportion of more than about 500 parts by weight the water resistance will be lowered.

Fluororubber or its compound can be added to the silica-containing thermosetting phenol resin-based vulcanizing adhesive in a proportion of not more than about 500 parts by weight, preferably about 30 to about 200 parts, to 100 parts by weight of the phenol resin. Addition of fluororubber (compound) can improve the heat resistance of the vulcanizing adhesive layer, but the addition in a proportion of more than about 500 parts by weight will lower the water resistance.

The silica-containing thermosetting phenol resin-based vulcanizing adhesive contains 11-80 parts by weight, preferably 15-65 parts by weight, of an aliphatic amine-based compound, or a mixture thereof with an imidazole-based compound as a curing accelerator on the basis of 100 parts by weight of thermosetting phenol resin. When the proportion is more than 80 parts by weight, the curing accelerator may remain after heat treatment under insufficient heat treatment conditions, thereby lowering the heat resistance more easily, whereas in the case of a proportion of less than 11 parts by weight the curing reaction will be insufficient to lower the liquid resistance more easily.

The aliphatic amine-based compound for use in the present invention includes compounds having an amine group directly bonded to the aliphatic group, for example, m-xylylenediamine ($NH_2CH_2(m-C_6H_4)CH_2NH_2$), hexamethylenediamine, octamethylenediamine, hexamethylenetetramine, etc., whereas the imidazole-based compound includes, for example, 2-ethyl-4-methylimidazole, 2-methylimidazole, 2-heptadecylimidazole, 2-undecylimidazole, etc., among which 2-ethyl-4-methylimidazole is preferably used.

The curing accelerator for use in the present invention comprises 100-10 wt. %, preferably 90-50 wt. %, of the aliphatic amine-based compound, and 0-90 wt. %, preferably 10-50 wt. %, of the imidazole-based compound. When the amount of the imidazole-based compound is more than 90 wt. %, the LLC resistance becomes unsatisfactory. In the amine-based compound, use of an aromatic amine-based compound in place of the aliphatic amine-based compound will also fail to give any satisfactory LLC resistance.

The silica-containing thermosetting phenol resin-based vulcanizing adhesive comprising the afore-mentioned components is prepared into an organic solvent solution in a concentration of the components of about 0.1 to about 10 wt. %, using an alcohol-based organic solvent such as methanol, ethanol, isopropanol, etc., a ketone-based organic solvent such as acetone, methyl ethyl ketone, methyl isobutyl ketone, etc., or a mixture thereof, and applied to the surface-treated steel sheet to a coating weight on each side of about 50 to about 2,000 $mg/m^2$ in the same manner as in the case of the surface-treating agent, followed by drying at room temperature or with hot air, and baking at about 100° to about 250° C. for about 1 to about 20 minutes.

Then, unvulcanized fluororubber compound is applied to both surfaces of the resulting vulcanizing adhesive layer as an organic solvent solution of the fluororubber compound, so that the unvulcanized fluororubber compound can form vulcanizate layers on both sides to a coating film thickness on each side of about 5 to about 120 μm.

The fluororubber for use in the present invention includes either polyol-vulcanizable or peroxide-vulcanizable fluororubber. One formulation example of unvulcanized fluororubber is given below.

Polyol-vulcanizable fluororubber generally includes copolymers of vinylidene fluoride with at least one of other fluorine-containing olefins such as hexafluoropropene, pentafluoropropene, tetrafluoroethylene, trifluorochloroethylene, vinyl fluoride, perfluoro-(methyl vinyl ether), etc. or copolymers of fluorine-containing olefin with propylene, or the like, and can be polyol-vulcanized with a polyhydroxyaromatic compound such as 2,2-bis(4-hydroxyphenyl) propane, 2,2-bis(4-hydroxyphenyl)perfluoropropane, hydroquinone, etc.

Peroxide-vulcanizable fluororubber includes, for example, fluororubbers containing iodine and/or bromine in the molecule, and can be vulcanized (cross-linked) with an organic peroxide as used generally in the peroxide vulcanization. In this case, it is preferable to use an organic peroxide together with a polyfunctional unsaturated compound, typically triallyl isocyanurate.

(Formulation Example)

|  | Parts by weight |
|---|---|
| Fluororubber (Viton E45, a product of DuPont) | 100 |
| Calcium metasilicate | 40 |
| MT carbon black | 20 |
| Magnesium oxide (Magnesia #150, a product of Kyowa Chemical Co.) | 6 |
| Calcium hydroxide | 3 |
| Vulcanizing agent (Curative #30, a product of DuPont) | 2 |
| Vulcanization accelerator (Curative #20, a product of DuPont) | 1 |

The resulting unvulcanized rubber coating layers are dried at room temperature to about 100° C. for about 1 to about 15 minutes to evaporate off alcohols such as methanol, ethanol, etc., ketones such as methyl ethyl ketone, methyl isobutyl ketone, etc., or a mixture thereof used as an organic solvent, followed by vulcanization by heating at about 150° to about 230° C. for about 0.5 to about 30 minutes, and by pressure vulcanization, if necessary. The vulcanized fluororubber layers desirably have a hardness (Durometer A) of 80 or more, and a compression set (100° for 22 hours) of 50% or less from the viewpoint of gasket use, without any particular limitation by formulation contents.

In the case sticking prevention is required, an anti-sticking agent can be applied to the surfaces. The anti-sticking agent is used to prevent sticking between rubbers themselves or between the rubber and the metal. Any anti-sticking agent can be used, so far as it can form a film layer on the vulcanized fluororubber layers, and includes, for example, silicone series, fluorine series, graphite series, wax series of amides, paraffins, etc., polyolefin series, or polybutadiene series, and preferably an anti-sticking agent comprising a dispersion in an organic solvent of liquid 1,2-polybutadiene hydroxyl group-containing material, 1,2-polybutadiene isocyanate group-containing material, and polyolefin-based resin is used.

Patent Literature 3 JP-A-7-165953

EXAMPLES

The present invention will be described in detail below, referring to Examples.

Example 1

A surface-treating agent containing zirconium ammonium carbonate, phosphoric acid and alumina in elementary composition ratio (wt. %) so adjusted as to give ratios by elementary mass of Zr to P and to Al in the surface-treating agent coating film correspondingly as shown in the following Table 1, was applied to the surfaces of an alkali-defatted SUS301 stainless steel sheet (thickness: 0.2 mm) to a coating weight on each side of 200-300 $mg/m^2$, followed by drying at 200° C. for one minute. The surface treating agent was adjusted to a pH of 6-10 with ammonium hydroxide beforehand.

TABLE 1

| Elementary composition ratio of surface-treating agent layer | | | Ratios by elementary mass | | | |
|---|---|---|---|---|---|---|
| | | | Zr:P | | Zr:Al | |
| Zr | P | Al | Zr | P | Zr | Al |
| 35 | 10 | 55 | 78 | 22 | 39 | 61 |

A vulcanizing adhesive comprising the following components (12 parts by weight of total curing accelerator/100 parts by weight of phenol resin) was applied to the resulting surface-treating agent coated steel sheet to a coating weight of 1,500 mg/m², followed by drying at room temperature and baking at 220° C. for 5 minutes.

| | Parts by weight |
|---|---|
| Resol-type phenol resin (30 wt. % solution in methanol) | 100 (30 as resin) |
| o-Cresol novolak-type epoxy resin (Epikote 180S, a product of Japan Epoxy Resin Co.) | 18 |
| Colloidal silica (Snowtex MEK-ST, a product of Nissan Chemical Industries, Ltd., 30 wt. % solution in methyl ethyl ketone in terms of solid matters) | 40 |
| Fluororubber compound of the afore-mentioned Formulation Example (30 wt. % solution in methyl ethyl ketone) | 80 |
| Hexamethylenetetramine (Nocceler H, a product of Ouchi-Shinko Chemical Co.) | 2.5 (70 wt. % in weight ratio) |
| 2-ethyl-4-methylimidazole | 1.1 (30 wt. % in weight ratio) |
| Methyl ethyl ketone | 1,481 |

A 25 wt. % solution of fluororubber compound of the afore-mentioned Formulation Example in mixed solvents of methyl isobutyl ketone and methanol (weight ratio: 8:2) was applied to the vulcanizing adhesive-coated steel sheet, followed by drying at 60° C. for 15 minutes to form unvulcanized rubber layers to a thickness of 20 μm on each side, then by pressure vulcanization at 220° C. and 60 kgf/cm² (5.88 MPa) for 2 minutes, thereby obtaining a fluororubber-metal laminate gasket material.

The thus obtained gasket material was subjected to the following tests:

LLC resistance test: after immersing a gasket material into an aqueous 50 wt. % solution of LLC liquid (JCC310, a product of Nippon Chemical Co.) at 150° C. for 100 hours or 500 hours, followed by a flexibility test (using a mandrel, 4 mm or 2 mm in diameter) according to ASTM D3111-99 (2004) e1 corresponding to JIS K5600-5-1 to evaluate according to the following evaluation standard:

Mark 5: Neither cracking nor peeling

Mark 4: Small cracks at edges

Mark 3: Small cracks overall

Mark 2: Cracking overall

Mark 1: Complete peeling

Heat resistance test: after exposing a gasket material to heating with heated air at 220° C. for 100 or 240 hours, followed by a flexibility test (using a mandrel, 4 mm or 2 mm in diameter) according to ASTM D3111-99 (2004) el corresponding to JIS K5600-5-1 to evaluate according to the same evaluation standard as mentioned above.

Examples 2 to 5 and Comparative Examples 1 to 3

In Example 1, the amounts of aliphatic amine and imidazole changed, while keeping a ratio by weight of aliphatic amine (hexamethylene-tetramine)/imidazole (2-ethyl-4-methylimidazole) constant to 70/30 (except Comparative Example 1, where the ratio is 0/100), and total amount of curing accelerator (on the basis of 100 parts by weight of phenol resin), and the amount of methyl ethyl ketone (MEK) were changed as shown in Table 2, where the results of tests are given together.

TABLE 2

| | Example No. | | | | | Comp. Ex. No. | | |
|---|---|---|---|---|---|---|---|---|
| | 1 | 2 | 3 | 4 | 5 | 1 | 2 | 3 |
| [Vulcanizing adhesive composition] | | | | | | | | |
| Aliphatic amine (parts by wt.) | 2.5 | 4.2 | 8.4 | 12.6 | 14.7 | — | 1.7 | 17.9 |
| Imidazole (parts by wt.) | 1.1 | 1.8 | 3.6 | 5.4 | 6.3 | 2.4 | 0.7 | 7.7 |
| Total curing accelerator (parts by wt.) | 12 | 20 | 40 | 60 | 70 | 8 | 8 | 85 |
| MEK (parts by wt.) | 1481 | 1526 | 1638 | 1750 | 1806 | 1459 | 1459 | 1890 |
| [Evaluation results] | | | | | | | | |
| LLC resistance | | | | | | | | |
| 100 hr, 4 mm in diameter | 5 | 5 | 5 | 5 | 5 | 4 | 5 | 5 |
| 2 mm in diameter | 4 | 5 | 5 | 5 | 5 | 1 | 4 | 4 |
| 500 hr, 4 mm in diameter | 4 | 5 | 5 | 5 | 5 | 1 | 3 | 3 |
| 2 mm in diameter | 3 | 4 | 4 | 4 | 3 | 1 | 1 | 2 |
| Heat resistance | | | | | | | | |
| 100 hr, 4 mm in diameter | 5 | 5 | 5 | 5 | 5 | 5 | 5 | 3 |
| 240 hr, 2 mm in diameter | 5 | 5 | 5 | 5 | 4 | 5 | 5 | 2 |

Examples 6-10 and Comparative Examples 4 and 5

While keeping the total amount of curing accelerator (on the basis of 100 parts by weight of phenol resin) constant to 40 parts by weight and the amount of MEK constant to 1,638 parts by weight in the same manner as in Example 3, the amounts of aliphatic amine (hexamethylenetetramine) and imidazole (2-ethyl-4-methylimidazole) were changed to give ratios by weight as shown in Table 3, where the evaluation results are also shown. In Example 10, a mixture containing metaxylylenediamine (MXDA) (Epomate SA-1, a product of Japan Epoxy Resin Co.) was used as an aliphatic amine-based compound, and in Comparative Example 5 bis(3-ethyl-4-aminophenyl)methane (Kayahard A-A, a product of Nippon Kayaku Co.) was used as an aromatic amine-based compound.

TABLE 3

|  | Example No. | | | | | Comp. Ex. No. | |
| --- | --- | --- | --- | --- | --- | --- | --- |
|  | 6 | 7 | 8 | 9 | 10 | 4 | 5 |
| [Vulcanizing adhesive composition] | | | | | | | |
| Aliphatic amine (parts by wt.) | 12 | 2.4 | 6 | 9.6 | (8.4) | — | — |
| Aromatic amine (parts by wt.) | — | — | — | — | — | — | 8.4 |
| Imidazole (parts by wt.) | — | 9.6 | 6 | 2.4 | 3.6 | 12 | 3.6 |
| Aliphatic amine/imidazole | 100/0 | 20/80 | 50/50 | 80/20 | 70/30 | 0/100 | 70/30 |
| [Evaluation results] | | | | | | | |
| LLC resistance | | | | | | | |
| 100 hr, 4 mm in diameter | 5 | 5 | 5 | 5 | 5 | 4 | 4 |
| 2 mm in diameter | 4 | 4 | 5 | 4 | 5 | 2 | 2 |
| 500 hr, 4 mm in diameter | 4 | 4 | 5 | 5 | 5 | 2 | 2 |
| 2 mm in diameter | 3 | 3 | 4 | 4 | 4 | 1 | 1 |
| Heat resistance | | | | | | | |
| 100 hr, 4 mm in diameter | 5 | 5 | 5 | 5 | 5 | 4 | 5 |
| 240 hr, 2 mm in diameter | 4 | 5 | 5 | 5 | 5 | 3 | 4 |

It can be seen from the foregoing results that the present fluororubber-metal laminate gasket material has a good LLC resistance even against mandrel in diameter so small as to cause easy peeling.

The invention claimed is:

1. A fluororubber-metal laminate gasket material, which comprises a metal steel sheet, a zirconium element-, a phosphorus element-, and aluminum element-containing surface-treating agent layer, a silica-containing thermosetting phenol resin-based vulcanizing adhesive layer and a fluororubber layer, as successively laid upon one another on the metallic steel sheet, where the silica-containing thermosetting phenol-based vulcanizing adhesive is a thermosetting phenol resin-based vulcanizing adhesive comprising silica, thermosetting phenol resin and cresol novolak-type epoxy resin or phenol novolak-type epoxy resin, and further containing 11-80 parts by weight of an aliphatic amine-based compound or a mixture thereof with an imidazole-based compound as a curing accelerator comprising 100-10 wt.% of aliphatic amine-based compound and 0-90 wt.% of imidazole-based compound on the basis of 100 parts by weight of the thermosetting phenol resin.

2. A fluororubber-metal laminate gasket material according to claim 1, wherein the phenol resin is a resol-type phenol resin, or a thermosetting resin having a dihydrobenzooxazine ring.

3. A fluororubber-metal laminate gasket material according to claim 2, wherein the curing accelerator comprises 100-10 wt. % of aliphatic amine-based compound and 0-90 wt. % of imidazole-based compound.

4. A fluororubber-metal laminate gasket material according to claim 1, wherein the silica-containing thermosetting phenol resin-based vulcanizing adhesive contains 5-200 parts by weight of silica on the basis of 100 parts by weight of the phenol resin.

5. A fluororubber-metal laminate gasket material according to claim 1, wherein the silica-containing thermosetting phenol resin-based vulcanizing adhesive contains 20-200 parts by weight of cresol novolak-type epoxy resin or the phenol nonolak-type epoxy resin on the basis of 100 parts by weight of the phenol resin.

6. A fluororubber-metal laminate gasket material according to claim 1, wherein the silica-containing thermosetting phenol resin-based vulcanizing adhesive further contains unvulcanized fluororubber or a compound thereof.

7. A fluororubber-metal laminate gasket material according to claim 6 for use as an engine cylinder head gasket.

8. A fluororubber-metal laminate gasket material according to claim 1, wherein the aliphatic amine-based compound is m-xylylenediamine, hexamethylenediamine, octamethylenediamine, or hexamethylenetetramine.

9. A fluororubber-metal laminate gasket material according to claim 1, wherein an anti-sticking agent layer is further provided on the fluororubber layer.

10. A fluororubber-metal laminate gasket material according to claim 1 for use as an engine cylinder head gasket.

11. An engine cylinder head gasket prepared from a fluororubber-metal laminate gasket material according to claim 10.

12. An engine cylinder head gasket prepared from a fluororubber-metal laminate gasket material according to Claim 7.

* * * * *